United States Patent [19]

Monroe et al.

[11] Patent Number: 5,305,407
[45] Date of Patent: Apr. 19, 1994

[54] APPARATUS AND METHOD FOR UNDERWATER FIBER-OPTIC COUPLING

[75] Inventors: Marshall M. Monroe, Glendale; Kerry M. Perkins, Simi Valley, both of Calif.

[73] Assignee: The Walt Disney Company, Burbank, Calif.

[21] Appl. No.: 957,265

[22] Filed: Oct. 6, 1992

[51] Int. Cl.⁵ .............................. G02B 6/421
[52] U.S. Cl. ........................ 385/89; 385/921; 385/88
[58] Field of Search ............. 385/89, 88, 92, 90, 385/91, 93, 39, 94

[56] References Cited

U.S. PATENT DOCUMENTS

| | | | |
|---|---|---|---|
| 4,386,268 | 5/1983 | Kock | 385/94 |
| 4,431,262 | 2/1984 | Tolles | 385/39 |
| 4,461,537 | 7/1984 | Raymer, II et al. | 385/94 X |
| 4,534,651 | 8/1985 | Minikane | 356/440 |
| 4,639,077 | 1/1987 | Dobler | 385/92 |
| 4,762,381 | 8/1988 | Uemiya et al. | 385/88 |
| 4,836,635 | 6/1989 | De Amorim | 385/89 |
| 4,865,410 | 9/1989 | Estrada et al. | 385/92 |
| 5,065,226 | 11/1991 | Kluitmans et al. | 385/92 X |

*Primary Examiner*—John D. Lee
*Assistant Examiner*—Phan T. Heartney
*Attorney, Agent, or Firm*—Pretty, Schroeder, Brueggemann & Clark

[57] ABSTRACT

An apparatus and method for underwater coupling of a fiber-optic cable to a light source without exposing the light source to the surrounding water. The apparatus employs an optically clear coupling element having one or more blind holes on one surface sized to snugly hold a fiber optic cable. The coupling element closes a watertight enclosure containing a light source such that the blind holes are on the exterior of the enclosure. Light emitted by the light source can pass through the optically clear coupling element to be received by fiber-optic cables fitted into the exterior blind holes. The fiber optic cables can be removed and replaced without opening the enclosure and exposing the light source to contact by the surrounding water.

16 Claims, 2 Drawing Sheets

APPARATUS AND METHOD FOR UNDERWATER FIBER-OPTIC COUPLING

BACKGROUND OF THE INVENTION

This invention relates to fiber-optics and more specifically to underwater connection of fiber-optic cable to a light source.

Fiber-optic illumination is used in a variety of underwater applications. First, fiber-optic illumination may be used to bring light to a region which is too remote or otherwise inaccessible to an underwater lamp or other lighting system. Fiber-optic illumination allows light to be brought to an underwater location without invading the area with hazardous electrical cables or bulky battery packs. Fiber-optic illumination is of great benefit to underwater applications which require the transmission of light along a non-linear path. Moreover, fiber-optic illumination allows light to be transmitted over far greater distances underwater than a beam of light transmitted directly through the water which would otherwise be subject to dissipation by the volume and cloudiness of the water traversed. The use of fiber-optic transmission also eliminates the possibility of interference of the transmitted light by objects moving within the water.

Beyond visual illumination, fiber-optic light transmission greatly enhances the use of light for control and signalling applications. Underwater photoelectric controls are one specific application which is improved through the use of fiber-optic illumination. Underwater systems which transmit data, such as telephone or computer communication, similarly benefit from the use of fiber-optic light transmission.

Fiber-optic light transmission requires a light source at one end of the fiber-optic cable. In many underwater applications, it is advantageous to have the light source located underwater to minimize the distance over which the fiber-optic cable must carry the light to reach the desired location. The underwater location of the light source necessitates housing it within an enclosure capable of maintaining a watertight seal. Such an enclosure keeps water from contacting the electrical connections associated with the light source. The enclosure may also house a power supply to power the light source. A single enclosure may house a plurality of light sources powered either by a single power source or individually.

Fiber-optic cables, however, lack tensile strength due to their small diameter and are thus prone to breakage from either rough movement or repeated bending. Underwater applications present a harsh environment for fiber-optic cables as the cables tend to be flexed repetitively by even relatively calm water motion. Where fiber-optic cables are used by workers as underwater flashlights, the repeated maneuvering in such use leads to a short cable life. The short fiber-optic cable life necessitates frequent replacement of fiber-optic cables.

Typical connection, however, between the fiber-optic cable and the light source within the underwater enclosure, requires a cumbersome and time consuming procedure to replace a fiber-optic cable. To bring the fiber-optic cable to a position in which the light from the light source can be transmitted through the cable fiber-optically, it has been the practice to run the fiber-optic cable into the watertight enclosure through an opening which pierces the wall of the watertight enclosure. However, in order to protect the light source, its power supply, and any electrical components from contact by the surrounding water, the opening through which the fiber-optic cable passes must be sealed watertight after the fiber-optic cable is in place. Typically, a gasket must be installed to surround the fiber-optic cable where it passes through the opening to achieve this watertight seal. Alternatively, a gel must be applied to the junction of the opening and the fiber-optic cable passing through it. To bolster a watertight seal both approaches may be used in combination to minimize leakage. Unfortunately, neither method, nor their cumulative effect when used in conjunction, can absolutely ensure against leakage. Gels are prone to break down or wash away over time, and gaskets are prone to shrink or become brittle and fracture. Gaskets are further prone to develop tiny fissures or cracks, not readily detected upon inspection, which may allow seepage to occur. The high pressure associated with deep water locations, and the erosion associated with the turbulent water locations both increase the speed and likelihood of such seal failures.

Replacement of the fiber-optic cable in such systems necessarily breaks the watertight seal of the enclosure when the fiber-optic cable is removed from the enclosure opening. This leaves the electronic components exposed to water through the opening. Additional procedures are thus necessitated to safeguard the electrical components within the enclosure prior to removal of the fiber-optic cable being replaced. In applications in which the fiber-optic system is in a vessel or a tank, partial draining of such vessel or tank may be required to prevent water from entering the enclosure when the fiber-optic cable is removed. Alternatively, electrical components within the light source enclosure may be protected only by completely removing the entire enclosure from the water prior to removal of the fiber-optic cable.

In either case, after replacement of the fiber-optic cable has been accomplished, a watertight seal must again be established between the newly installed fiber-optic cable and the opening in the enclosure through which it passes. In systems using a gasket, the gasket must be reinstalled or perhaps replaced. In gel systems, the gel must be reapplied prior to re-submerging the light source enclosure to its underwater location. In addition to being time consuming, these additional sealing procedures necessitate the availability of the requisite sealing supplies whenever a fiber-optic cable must be replaced.

It can be appreciated from the foregoing that a need exists for an underwater coupling between a light source and a fiber-optic cable which eliminates the chance of leakage at the fiber-optic cable connection point, which allows the fiber-optic cable to be replaced without necessitating the removal of the light source enclosure from its underwater location, and which protects the enclosed electrical components from contact with the surrounding water during underwater fiber-optic cable replacement.

SUMMARY OF THE INVENTION

The present invention constitutes an apparatus and a method for underwater coupling of a light source and a fiber-optic cable which allows the light source and its electrical power supply to be housed in a watertight sealable enclosure and which further allows replacement of the fiber-optic cable without disturbing the watertight seal of the enclosure.

The invention uses an optically clear coupling element having a pair of opposing blind holes, holes that do not penetrate the entire thickness of the coupling element. The opposing blind holes are positioned so that light shown axially through one blind hole can be received axially through the other blind hole and retransmitted therefrom by a fiber-optic cable. The coupling element is integrated into the wall of a watertight enclosure so that one blind hole is on the interior of the enclosure and the other blind hole is on the exterior of the enclosure. Because the blind holes do not physically connect, and because neither hole penetrates through the entire thickness of the coupling element, the enclosure remains water-tight regardless of whether or not either blind hole is filled or sealed.

The interior blind hole is sized to snugly fit a light source and the exterior blind hole is sized to snugly fit a fiber-optic cable, allowing simple press fitting without the use of sockets or fastening devices. When a light source and a fiber-optic cable are thus fitted into their respective blind holes, light from the light source can be transmitted through the portion of the optically clear coupling element which separates the interior blind hole from the exterior blind hole to be received by the fiber-optic cable. The fiber-optic cable may be removed from the exterior blind hole and replaced without exposing the electrical components to water because the blind hole does not penetrate the entire thickness of the coupling element. The use of an exterior blind hole to couple a fiber-optic cable to a light source thus allows simple replacement of the fiber-optic cable without disrupting the watertight integrity of the light source enclosure.

BRIEF DESCRIPTION OF THE DRAWINGS

An apparatus for the underwater coupling of a fiber-optic cable and a light source, constructed in accordance with the invention herein described, for carrying out the preferred method, is illustrated in the accompanying drawings in which.

DETAILED DESCRIPTION OF THE INVENTION

Figure 1:
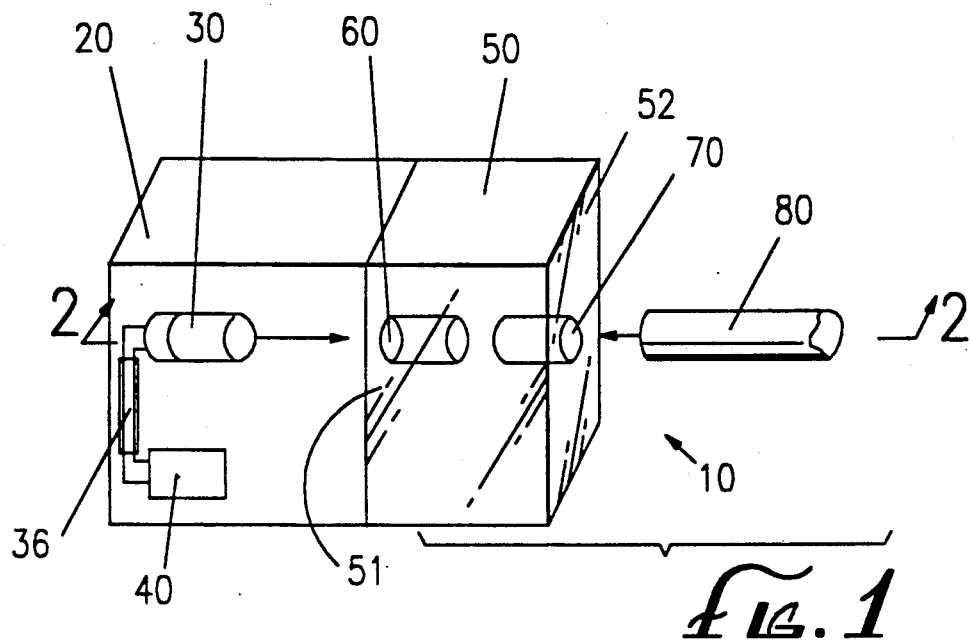
FIG. 1 is a perspective view of an underwater fiber-optic coupler in accordance with the invention.
Figure 2:
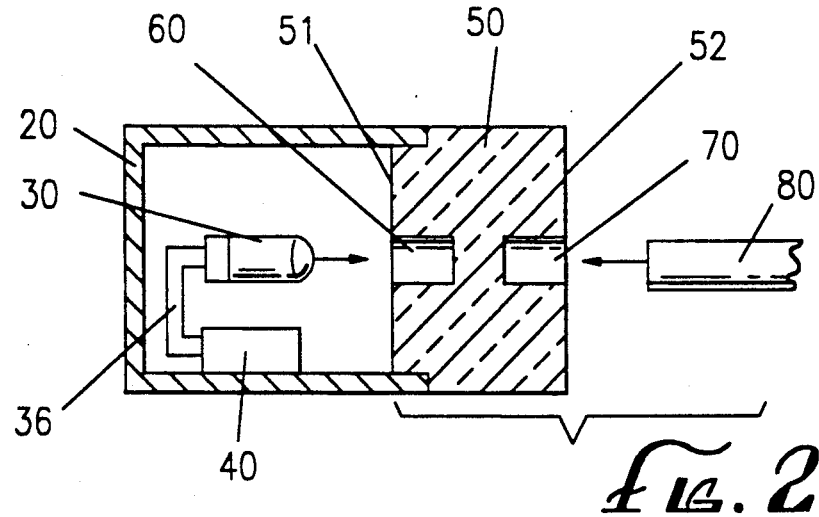
FIG. 2 is a cross sectional side view, along the axis 2—2 of FIG. 1.
Figure 2A:
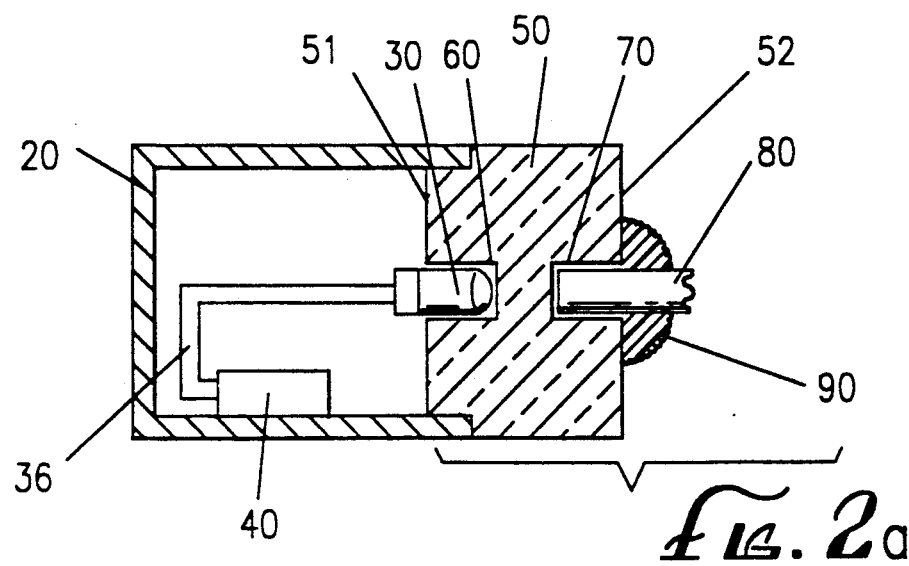
FIG. 2a is a cross sectional side view of the coupler of FIGS. 1 and 2 showing the light source and fiber-optic in their operational positions.

FIGS. 1, 2, and 2a show an apparatus, constructed according to the proposed embodiment of the invention, for the underwater coupling of a fiber-optic cable to a light source in which the fiber-optic cable can be removed and replaced, while the apparatus is submerged, without exposing the light source and electrical components to water.

The coupling apparatus 10 includes a watertight enclosure 20 having an interior space housing a light source 30, a power supply 40, and a conductive wire 36 connecting the two. A clear optical coupling element 50 is configured as a watertight lid for the enclosure 20, so that a first surface 51 of the coupling element is on the interior of the enclosure 20 and a second surface 52 of the coupling element is on the exterior of the enclosure 20 when the lid is closed. An interior blind hole 60, sized to snugly fit a light emitting diode light source 30, extends into the interior surface 51. An exterior blind hole 70, sized to snugly fit a fiber-optic cable 80, extends into the exterior surface 52. The interior blind hole 60 and exterior blind hole 70 are aligned to oppose each other with collinear axes. In this manner, when the light source 30 is press fitted into the interior blind hole 60 and the fiber-optic cable 80 is press fitted into the exterior blind hole 70, (see FIG. 2a) light from the light source can travel from the interior blind hole 60, through the clear optical coupling element 50, to the exterior blind hole 70, to be received by the fiber-optic cable 80. Because neither the interior blind hole 60 nor the exterior blind hole 70 penetrate the entire thickness of the optical coupling element 50, the fiber-optic cable 80 can be removed from the exterior blind hole 70 for replacement without breaking the watertight seal of the enclosure 20.

The interior blind hole 60 is sized to hold the light source 30 by friction and the exterior blind hole 70 is sized to hold fiber-optic cable 80 by friction. In applications or environments in which there is a high degree of movement or tugging upon the fiber-optic cable, a strain relieving support 90 (shown in FIG. 2a) in the form of a gel or curable adhesive may be applied at the junction of blind hole 70 and fiber-optic cable 80 after the fiber-optic cable has been inserted into the blind hole. A silicone based adhesive, either in gel form or in the form of an underwater curable adhesive, is well suited to this function. The gel or curable adhesive relieves stress upon the fiber-optic cable against the edge of blind hole 70 as the unanchored portion of the fiber-optic cable is moved about. The gel or curable adhesive also provides additional anchoring of the fiber-optic cable in addition to the friction hold of blind hole 70. The gel or curable adhesive serving as the strain relieving support 90 does not function as a waterproofing or sealing layer because exterior blind hole 70 does not penetrate the entire thickness of optical coupling element 50, and thus no fluid can enter the enclosure 20 through exterior blind hole 70 whether exterior blind hole 70 is sealed or not.

A light source comprised of a light emitting diode works well in this application. Coherent or laser light is also well suited, and allows fiber-optic cable signaling applications to be performed. Laser diode, helium-neon (HeNe), argon and krypton laser light sources work well with the optical coupler herein described. The power supply may be any of a variety of batteries available. Nickel-cadmium (NiCad) rechargeable batteries are well suited to this use. An optically clear coupling element, made from optically clear polycarbonate, gives good results and a fiber-optic cable of 100 mils plastic, that is, fiber-optic cable having a cross-section 1/10 inch in diameter is well suited to this application.

Figure 3:
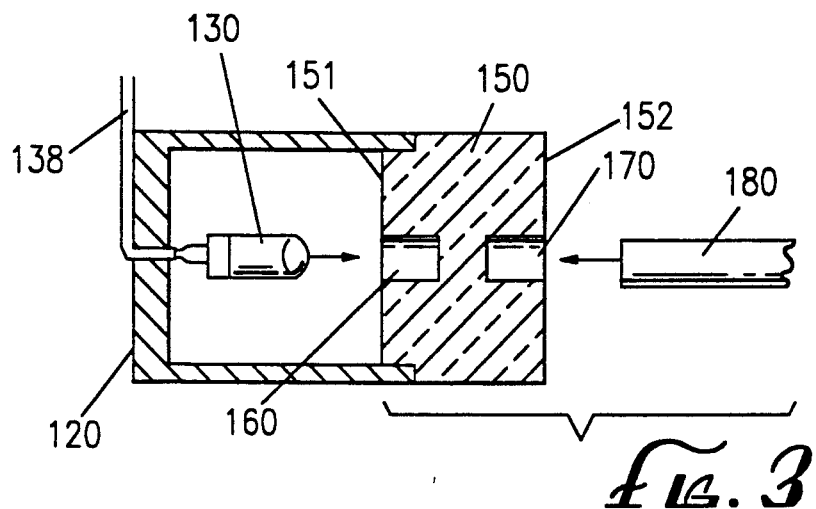
FIG. 3 is a cross sectional side view of a first alternative embodiment of the invention.

Referring now to FIG. 3, a first alternative embodiment is shown. In this embodiment, a waterproof power cable 138 connects the light source 130 to a remote power source (not shown) located outside of the watertight enclosure 120.

Figure 4:
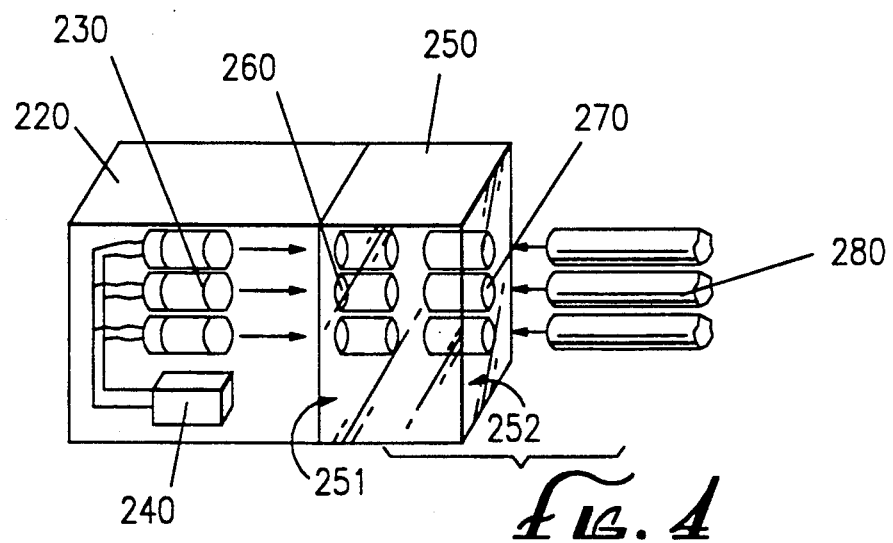
FIG. 4 is a perspective view of a second alternative embodiment of the invention.

Referring now to FIG. 4, a second alternative embodiment is shown in which a single coupling element 250 connects multiple pairs of light sources and fiber-optic cables. In this embodiment, the interior surface 251 of coupling element 250 is provided with three interior blind holes 260 each sized to snugly hold by friction one of the light sources 230. The exterior surface 252 of coupling element 250 is provided with three opposing exterior blind holes 270 sized to snugly hold by friction one of the fiber-optic cables 280. Light sources 230 are press fitted into the interior blind holes 260. Fiber-optic cables 280 are press fitted into exterior blind holes 270.

For multiple light source applications using light emitting diodes, a nine volt transistor radio type battery is well suited as the power supply. It should be appreciated, however, that different light sources will have different power supply requirements. Multiple light sources are preferably wired in parallel.

Figure 5:
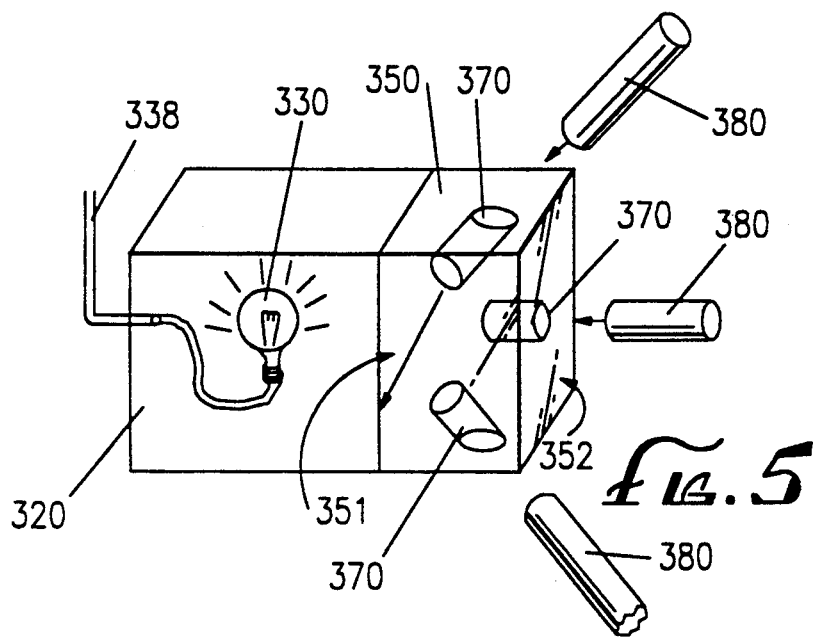
FIG. 5 is a perspective view of a third alternative embodiment of the invention.

Referring now to FIG. 5, a third alternative embodiment is shown. The exterior surface 352 of coupling element 350 is provided with a plurality of blind holes 370 positioned on different faces of the exterior surface 352. The exterior blind holes are each sized to hold a fiber-optic cable by friction. The interior surface 351 of the coupling element 350 has no blind holes. A light source 330 generates light which passes through the optically clear coupling element 350 to be received by fiber-optic cables 380. Fiber-optic cables generally have a high tolerance for variation in the angle of incidence of the light received for fiber-optic transmission. This allows placement of the blind holes at varying degrees of orientation with respect to the light source, and even allows placement of the blind holes along different faces of exterior surface 352 of the coupling element 350.

In this embodiment, the light source 330 is shown as an incandescent type of light bulb. Such a non-directional light source allows light to reach and be received for transmission by the fiber-optic cables positioned in different orientations. It should be appreciated, however, that any light source that illuminates the fiber-optic cable, held within an exterior blind hole at a chosen location and orientation so that light may be transmitted fiber-optically, may be used.

In the preferred embodiment of the invention thus far described, a watertight enclosure is fitted with a removable clear lid, which maintains a watertight seal when closed, and which serves as an optical coupling element. The optical coupling element has one or more pairs of opposing blind holes arranged such that one blind hole of a pair is on the interior of the enclosure with the other on the exterior when the coupling element is seated to seal the enclosure. The blind holes are aligned with substantially collinear axes so light may pass axially from an interior blind hole to be received axially by the opposing exterior blind hole. The interior blind holes are each sized to snugly hold and form a friction fit with a light source in the form of a light emitting diode. The exterior blind holes are each sized to snugly hold and form a friction fit with a fiber-optic cable. With a light emitting diode and a fiber-optic cable thus installed, illumination of the light emitting diode sends light axially from the interior blind hole through the clear coupling element to the opposing exterior blind hole, where it is received axially by the fiber-optic cable and thereby transmitted fiber-optically. Each fiber-optic cable in such an assembly can be removed from the exterior blind hole in which it is held without breaking the watertight seal of the enclosure.

While reference has been made to underwater environments, it should be appreciated that the invention may be used advantageously for coupling a fiber-optic cable and a light source within fluids other than water. Moreover, the invention provides a fluid imersible fiber-optic cable and light source connection which can be used in fluid submerged environments as well as in other environments where the connection might be subjected to rain, water spray, or other fluid contact.

Although the invention has been described with respect to specific embodiments, it will be appreciated that modifications that would be obvious to a person of ordinary skill in the pertinent art may be made without departing from the invention defined in the following claims.

I claim:
1. A fluid impervious coupler for coupling a light source and at least one fiber-optic cable comprising:
   a fluid impervious enclosure defining an interior space in which the light source is housed;
   an optically clear coupling element forming a part of said enclosure;
      said coupling element having an interior surface facing into said interior space, and
      an exterior surface facing outwardly from said enclosure; and
   a blind hole extending into said exterior surface less than all the way through said coupling element, said blind hole sized to snugly hold the fiber-optic cable and form a friction fit therewith, the light from the light source passing through said optically clear coupling element into the fiber-optic cable for transmission along it,
whereby the fiber-optic cable can be removed and replaced without intrusion of fluid into said fluid impervious enclosure.

2. A coupler as in claim 1 for coupling of plural fiber-optic cables further comprising:
   a plurality of blind holes extending into said exterior surface less than all the way through said coupling element, said blind holes each sized to snugly hold one of the fiber-optic cables and form a friction fit therewith.

3. A coupler as in claim wherein said optically clear coupling element is formed as a fluid-tight lid fitting said enclosure.

4. A coupler as in claim 1 further including:
   a replaceable power supply housed in said enclosure for powering the light source.

5. A fluid impervious coupler for coupling a light source and at least one fiber-optic cable comprising:
   a watertight enclosure defining an interior space in which the light source is housed;
   an optically clear coupling element forming a part of said enclosure,
      said coupling element having an interior surface facing into said interior space; and
      an exterior surface facing outwardly from said enclosure;
   an interior blind hole extending into said interior surface less than all the way through said coupling element, said interior blind hole sized to snugly hold the light source and form a friction fit therewith; and
   an exterior blind hole extending into said exterior surface less than all the way through said coupling element, said exterior blind hole sized to snugly hold a fiber-optic cable and form a friction fit therewith, said first and second blind holes being axially aligned on opposite sides of an intervening region of said coupling element, the light from the light source passing through said optically clear coupling element into the fiber-optic cable for transmission along it, whereby the fiber-optic cable can be removed and replaced without intrusion of water into said watertight enclosure.

6. A coupler as in claim 5 wherein said optically clear coupling element is formed as a watertight lid fitting said enclosure.

7. A coupler as in claim 5 further including:
a replaceable power supply within said enclosure for powering said light source.

8. A coupler as in claim 5 wherein said coupling element is formed of clear polycarbonate.

9. A coupler as in claim 5 wherein said light source is a light emitting diode.

10. A coupler as in claim 5 wherein said interior blind hole and said exterior blind hole are aligned with their axes collinear.

11. A coupler as in claim 5, for plural light sources and plural fiber-optic cables further comprising:
a plurality of interior blind holes extending into said interior surface less than all the way through said coupling element, said interior blind holes each sized to snugly hold one of the plural light sources and form a friction fit therewith; and
a plurality of exterior blind holes extending into said exterior surface less than all the way through said coupling element, said exterior blind holes aligned in pairs with said interior blind holes and each sized to snugly hold one of the plural fiber optic cables and form a friction fit therewith.

12. A method for underwater coupling of a light source and a fiber-optic cable that permits removal and recoupling of the fiber-optic cable without exposing the light source or other electrical components to the water, comprising the steps of:
forming a watertight enclosure defining an interior space;
housing the light source within said enclosure;
forming a transparent coupling element as part of the watertight enclosure with an interior surface facing into the interior space and an exterior surface facing outwardly from the enclosure;
forming an exterior blind hole in the exterior surface extending less than all the way through the coupling element, sized to snugly fit the fiber-optic cable and hold the same by a friction fit;
removably fitting the fiber-optic cable into the blind hole.

13. The method as defined in claim 12 using a generally cylindrically shaped light source, the method including the steps of,
forming an interior blind hole in the interior surface of the coupling element, sized to fit the light source and hold the same by a friction fit, in axially aligned relation with the exterior blind hole and spaced therefrom by an intervening region of the coupling element, and inserting the light source into the interior blind hole.

14. The method as defined in claim 12, including the additional step of
forming a strain relieving support around the fitted fiber-optic cable at the junction of the fiber-optic cable, the exterior blind hole, and the exterior surface.

15. The method as defined in claim 14, wherein the strain relieving support consists of a layer of gel.

16. The method as defined in claim 14, wherein the strain relieving support is formed of an adhesive which is curable underwater.

* * * * *